D. E. NUTTALL.
WEED PULLER.
APPLICATION FILED FEB. 26, 1913.
1,082,547.
Patented Dec. 30, 1913.
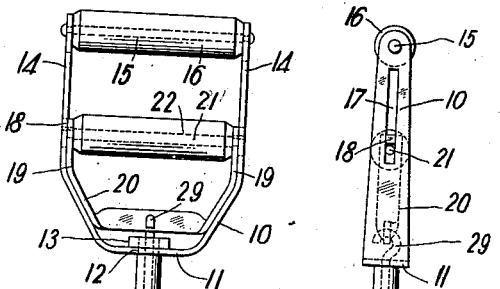
FIG. 3
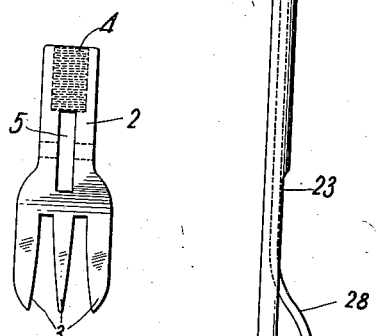
FIG. 1
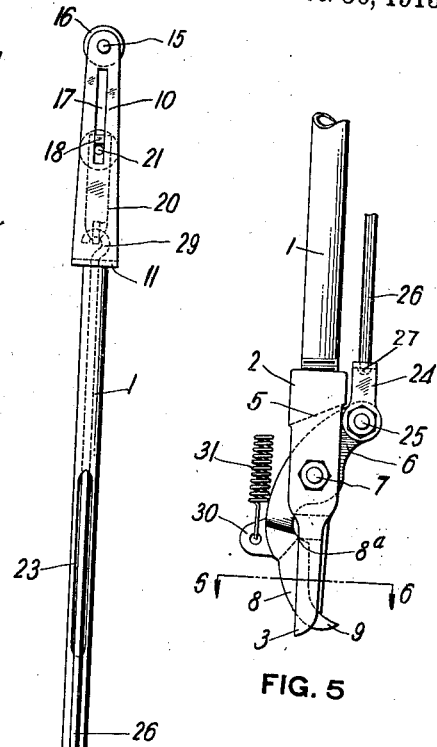
FIG. 5
FIG. 2
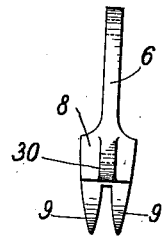
FIG. 4
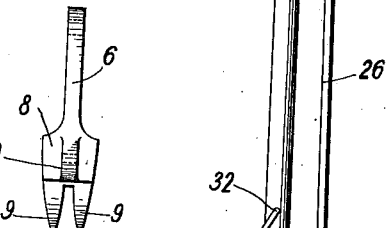
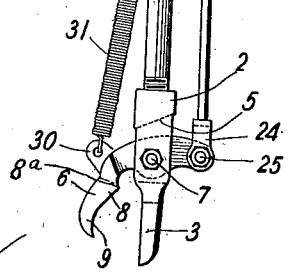
FIG. 6
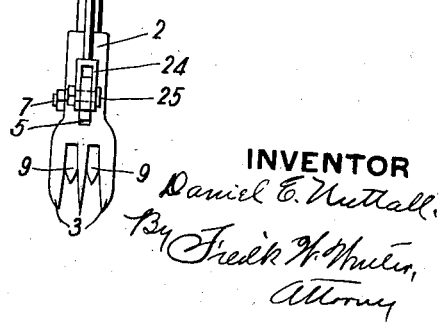
WITNESSES
Chas. Josterman
Elbert L. Hyde
INVENTOR
Daniel E. Nuttall
By Fredk. W. Wheeler,
Attorney

UNITED STATES PATENT OFFICE.

DANIEL E. NUTTALL, OF EMSWORTH, PENNSYLVANIA.

WEED-PULLER.

1,082,547.

Specification of Letters Patent. Patented Dec. 30, 1913.

Application filed February 26, 1913. Serial No. 750,757.

*To all whom it may concern:*

Be it known that I, DANIEL E. NUTTALL, a resident of Emsworth, in the county of Allegheny and State of Pennsylvania, have invented a new and useful Improvement in Weed-Pullers, of which the following is a specification.

This invention relates to a device for pulling weeds.

The object of the invention is to provide a simple weed puller having grappling members which can be thrust into the earth and around the stem and roots of the weed without cutting the same, so that the weed may be bodily removed, and which is also provided with operating handle mechanism so that it can be readily manipulated with one hand.

The invention comprises the construction and arrangement of parts hereinafter described and claimed.

In the drawings Figure 1 is a side view of a weed puller embodying the invention; Fig. 2 is an edge view thereof; Fig. 3 is a detail view of a blade member; Fig. 4 is a detail view of the grappling hook or member; Fig. 5 is a detail view corresponding to Fig. 1 and showing the grappling members closed; and Fig. 6 is a section on the line 6—6, Fig. 5.

The weed puller shown in the drawings comprises a rigid rod or staff 1 on which the various parts of the mechanism are mounted. Said rod or staff 1 is tubular and, at its lower end, is provided with a blade member 2 having one or a plurality of teeth or prongs 3, three being shown, which are adapted to be thrust into the ground at one side of the weed. The blade member 2 may be integral with the rod, but preferably is provided in its upper end with a threaded socket 4 into which the lower end of the rod is threaded.

Pivotally connected to the blade member 2 on a suitable bolt or pivot 7 is a lever 6, which may be applied to one side of said blade member but preferably, and as shown, extends through a transverse slot or opening 5 therein. The lower end of the lever 6 is in the form of a grappling member or hook 8 and is provided with one or a plurality of teeth or prongs 9, two being shown. Preferably, the number of teeth or prongs 9 on the grappling hook 8 will be one more or less than the number of teeth or prongs in the blade member 2, so that the teeth or prongs of the two members will interfit in staggered relation with each other. Also, said teeth are formed substantially triangular in cross section, as indicated in Fig. 6, so the sharp edges 9ª on teeth 9 will project down between teeth 3 when the members are closed and free them from clinging dirt or earth. The grappling member 8 is also provided with a shoulder 8ª which in closing the device contacts with the upper face of the blade 2, as indicated in Fig. 5, to limit the movement.

At its upper end the rod or staff 1 is provided with a handle comprising a U-shaped yoke or member 10 having a base 11 provided with a threaded opening 12 into which the upper end of the rod is screwed. Said member 10 is secured to the rod by a locknut 13 threaded onto the end thereof. The outer free ends of the arms 14 of U-shaped member 10 are connected by a rod or pin 15 riveted or otherwise secured at its ends to said arms, and having a roller or handle member 16 loosely rotatable thereon.

Slidably connected to travel along the arms 14 of the member 10 is a U-shaped yoke 20, which has side arms 19 connected at their free ends by a pin or shaft 21, on which loosely rotates a roller or handle member 22. The yoke 20 and arms 14 may be connected to each other in any suitable manner, as by forming the arms 14 channel shaped in cross section with the yoke arms 19 sliding therein, or by providing the yoke arms 19 with lugs or projections embracing the side edges of the arms 14. Preferably, however, and as shown, the arms 14 are provided with longitudinal guiding slots 17 into which project lugs or projections 18 on the ends of the arms 19.

The tubular rod or shaft 1 is provided intermediate its ends with a longitudinal side slot or opening 23. The grappling lever 6, at its upper end, is provided with a yoke 24 which is pivoted on a bolt or pin 25 passing through said lever. A rod or tension member 26 at one end passes through an aperture in the yoke 24 and has its end 27 headed over on the inside of said yoke. Said tension member 26, intermediate its ends, is bent laterally, as at 28, and passes through the longitudinal side slot 23 into the inside of the tubular staff 1, and at its other extreme end is bent into the form of a hook 29 which passes through an aperture in the flat base of the yoke 20.

The grappling lever 6 on its upper edge is provided with a lug 30 to which is connected one end of a tension spring 31, the other end of which is connected to the rod or staff 1, as at 32.

The parts of the weed puller normally occupy the positions shown in full lines in Fig. 1, the spring 31 holding the grappling hook 8 away from the blade member 2, with the handle member 22 at its lowest position of movement. The implement is grasped by the upper handle member and the blade 2 is thrust into the earth at one side of the root or weed to be extracted. The prongs or teeth 3 pass down between the root tendrils without severing the same. After the blade member has been inserted the handle member 22 is pulled upwardly toward the handle member 16, thus placing the rod 26 under tension and oscillating lever 6 around its pivot against the action of its spring 31. During this movement the two handle members 16 and 22 are retained in parallelism by the lugs 18 which travel and are guided in the slots 17 in the arms of the yoke. Possible relative rotation of the two handle members is thus prevented. The movement is continued until the teeth of the grappling hook 8 are forced as close to the teeth of the blade 2 as possible, in most cases overlapping the same, as indicated in Fig. 5. The implement is then lifted by pulling upwardly on the handle member 21, which retains the grappling member 8 and the blade 2 in clasped position with the weed or root therebetween. After the weed has been extracted the handle member 22 is released and the spring 31 thereupon oscillates the grappling lever 6 about its pivot and restores the parts to their original positions.

The device is quite simple and can be constructed at low cost. It insures the removal of the entire root or weed, without severing any portions thereof which might remain in the earth and result in the growth of a new plant. The device can also be readily operated with but one hand and requires but two movements for the removal of a weed. That is to say, it is merely necessary to first thrust the blade 2 into the earth by pressure on the handle member 16 and then remove the implement and weed by pulling upon the handle 22.

What I claim is:

1. A weed puller comprising a tubular rod having its upper end open and provided at its lower end with a blade adapted to be thrust into the earth, a double-armed lever pivotally connected to said rod and having one arm provided with a grappling member adapted to coöperate with said blade, a handle member rigidly secured to the upper open end of said rod, a tension member connected to the other arm of said lever and extending part way along the outside of and then into and through said hollow rod and projecting from the open end thereof, and a member slidable in said handle member and secured to the upper end of said tension member for operating the same to force the grappling member toward said blade.

2. A weed puller comprising a rod having a forked blade member rigidly secured at its lower end and provided with straight teeth adapted to be thrust into the earth, a grappling member pivotally connected to said blade member and having teeth arranged in staggered relation with the teeth of said forked blade, the teeth of said grappling member having substantially straight portions and hook-shaped ends, the straight portions of the teeth lying in substantial parallelism with the teeth of the forked blade member and the hook-shaped ends passing between the teeth of the forked blade member when the device is closed.

3. A weed puller comprising a rod having a forked blade member rigidly secured to its lower end and provided with straight teeth adapted to be thrust into the earth, a grappling member pivotally connected to said blade member and having teeth arranged in staggered relation with the teeth of said forked blade, the teeth of said grappling member being hook-shaped at their ends to pass between the teeth of said forked blade, interengaging parts on said forked blade and grapping member and adjacent to the pivotal connection therebetween for limiting the closing movement therebetween, and means for operating said grappling member.

4. A weed puller comprising a rod having a forked blade member rigidly secured to its lower end and provided with straight teeth adapted to be thrust into the earth, a grappling member pivotally connected to said blade member and having teeth arranged in staggered relation with the teeth of said forked blade, the teeth of said grappling member being curved at their ends to pass between the teeth of said forked blade and being wedge-shaped in cross section and adapted to wedge between the teeth of said forked blade, and means for operating said grappling member.

5. A weed puller comprising a rod having a forked blade member rigidly secured to its lower end and provided with straight teeth adapted to be thrust into the earth, a grappling member pivotally connected to said blade member and having teeth arranged in staggered relation with the teeth of said forked blade, the teeth of said grappling member being curved at their ends to pass between the teeth of said forked blade, the teeth of said forked blade and grappling member being wedge-shaped in cross section, and the teeth of the grappling member being adapted to wedge between the wide portions of the teeth of said forked blade, and means for operating said grappling member.

6. A weed puller comprising a rod provided with a blade at one end, a grappling member for coöperation with said blade, a tension member for operating said grappling member, a yoke-shaped handle secured to the upper end of said rod and having longitudinally slotted side arms, a rod connecting the free ends of the arms of said yoke and carrying a roller, a second yoke-shaped handle connected to said tension member and having projections sliding in the longitudinal slots in said side arms, and a rod connecting the arms of said second yoke and carrying a roller thereon.

In testimony whereof, I have hereunto set my hand.

DANIEL E. NUTTALL.

Witnesses:
ELBERT L. HYDE,
WILLIAM B. WHARTON.